United States Patent [19]

Carlson, Jr.

[11] 4,186,613
[45] Feb. 5, 1980

[54] MECHANICAL MOVEMENT
[75] Inventor: William L. Carlson, Jr., St. Cloud, Minn.
[73] Assignee: General Signal Corporation, Stamford, Conn.
[21] Appl. No.: 849,749
[22] Filed: Nov. 9, 1977
[51] Int. Cl.² ............................................. F16h 37/12
[52] U.S. Cl. ........................................ 74/52; 92/140; 251/229; 74/571 M
[58] Field of Search ................ 257/229, 248, 249.5, 257/250; 74/50, 54, 52, 571 M; 92/140

[56] References Cited
U.S. PATENT DOCUMENTS

| | | | |
|---|---|---|---|
| 1,565,264 | 12/1925 | Dubi | 74/571 M |
| 1,867,981 | 7/1932 | Mudd | 74/52 |
| 2,051,783 | 8/1936 | Dake | 74/571 M |
| 2,067,399 | 1/1937 | Hughes | 74/571 M |
| 2,174,780 | 10/1939 | Dusevoir | 74/571 M |
| 2,592,237 | 4/1952 | Bradley | 74/571 M |
| 3,184,214 | 5/1965 | King | 251/250 |

FOREIGN PATENT DOCUMENTS 1917636 12/1969 Fed. Rep. of Germany .
2241973 6/1972 Fed. Rep. of Germany .

Primary Examiner—Samuel Scott
Assistant Examiner—G. Anderson
Attorney, Agent, or Firm—Jeffrey S. Mednick

[57] ABSTRACT

A mechanical movement is provided for converting between linear and rotational movement and includes a frame adapted to move only along a linear path of travel. A first rotatable member is adapted to bear against the frame in such a manner that the first rotatable member is free to rotate with respect to the frame. A second rotatable member is adapted to bear against the first rotatable member in such a manner that the second rotatable member is free to rotate with respect to the first rotatable member in an eccentric fashion. A third rotatable member is affixed to the second rotatable member and is adapted to rotate therewith about a fixed axis. Means are provided for minimizing the sideward thrust on the first and second rotatable members so that linear movement of the frame will be converted to rotational movement of the third rotatable member and so that rotational movement of the third rotatable member will be converted to linear movement of the frame. The third rotatable member may also be connected to a valve stem for opening and closing a valve, so that linear movement of the frame will result in rotational movement of the valve stem.

12 Claims, 9 Drawing Figures

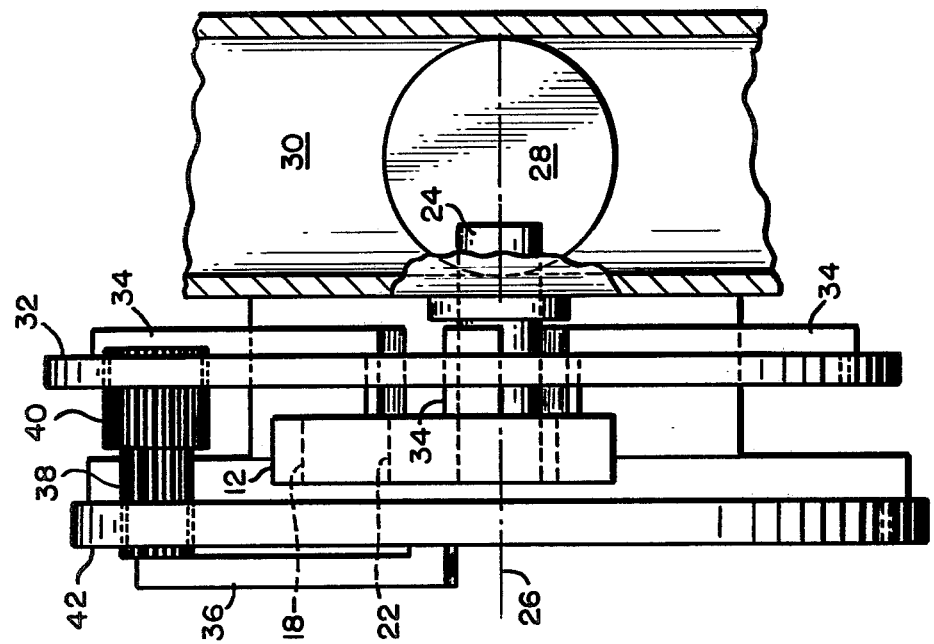
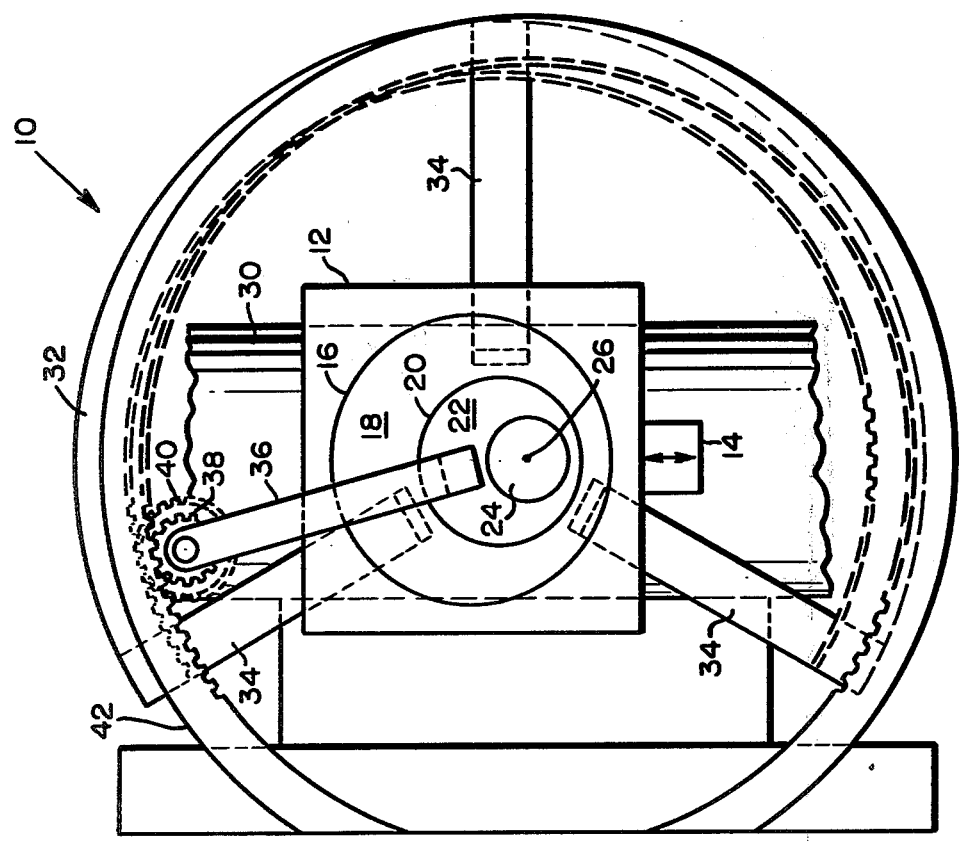
FIG. 2
FIG. 1

4,186,613

MECHANICAL MOVEMENT

BACKGROUND OF THE INVENTION

The present invention relates generally to mechanical movements and more particularly to a mechanical movement for converting between linear and rotational movement.

In a wide variety of prior applications it has frequently been desirable to mechanically convert between linear and rotational movement. Most prior devices that have accomplished such a conversion have been space consuming, expensive, and have had a rather limited load capability. However, as is illustrated in U.S. Pat. No. 1,867,981 to Mudd, a more simple mechanical movement is known for changing reciprocating linear movement to rotational movement. The movement shown in Mudd includes a ring secured to a piston rod. Mounted inside the ring by means of roller bearings are eccentric plates with an output shaft affixed to the innermost eccentric plate to yield rotational movement in response to the reciprocating movement of the piston. A similar mechanical movement is illustrated in U.S. Pat. No. 2,782,646 to Christian. Although movements of the type discussed above are capable of functioning when relatively lightly loaded, it has now been discovered that certain stresses are produced during the operation of such a movement which have prevented its use under heavier load conditions.

SUMMARY OF THE INVENTION

Accordingly, a mechanical movement is provided for converting between linear and rotational movement and includes a frame adapted to move only along a linear path of travel. A first rotatable member is adapted to bear against the frame in such a manner that the first rotatable member is free to rotate with respect to the frame. A second rotatable member is adapted to bear against the first rotatable member in such a manner that the second rotatable member is free to rotate with respect to the first rotatable member in an eccentric fashion. A third rotatable member is affixed to the second rotatable member and is adapted to rotate therewith about a fixed axis. Means are provided for minimizing the sideward thrust on the first and second rotatable members so that linear movement of the frame will be converted to rotational movement of the third rotatable member and so that rotational movement of the third rotatable member will be converted to linear movement of the frame. The third rotatable member may also be connected to a valve stem for opening and closing a valve, so that linear movement of the frame will result in rotational movement of the valve stem.

Objects of the Invention

An object of the present invention is the provision of a mechanical movement for converting between linear and rotational movement which can operate under a substantial load.

Another object of the present invention is the provision of a mechanical movement for converting between linear and rotational movement which occupies a relatively small amount of space.

A further object of the present invention is the provision of a mechanical movement for converting between linear and rotational movement which comprises a small number of easily fabricated elements permitting ease and economy of manufacture.

Still another object of the present invention is the provision of a mechanical movement for converting between linear and rotational movement which is suitable for use as a valve actuator.

Other objects, advantages, and novel features of the present invention will become apparent from the following detailed description of the invention when considered in conjunction with the accompanying drawings.

BRIEF DESCRIPTION OF THE DRAWINGS

FIG. 1 shows a front view of a valve actuator employing the mechanical movement of the present invention.

FIG. 2 shows a top view of the valve actuator shown in FIG. 1.

DESCRIPTION OF THE PREFERRED EMBODIMENT

Figure 3C:
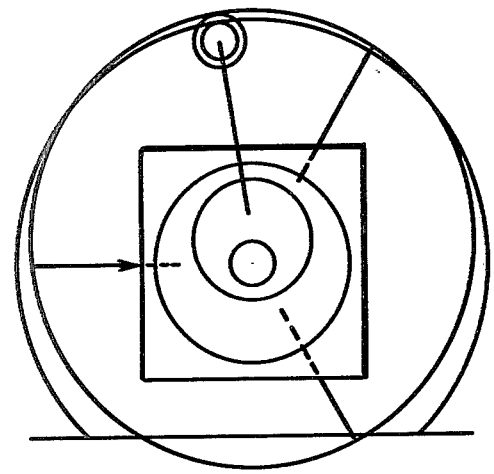
FIGS. 3A through 3E illustrate, in schematic form, the operation of the mechanical movement of the present invention.

FIG. 1 shows a valve actuator 10 including the mechanical movement of the present invention. The actuator includes a frame 12 which moves only along a linear path of travel. The frame 12 receives a linear input from a unit 14 connected thereto. The linear input unit 14 is shown in block form only and may be any prime mover having sufficient linear force to propel the actuator in a given application. Preferably, the unit 14 is a short stroke diaphragm operated device. The frame 12 has an opening or bore 16 therein which defines an inner surface for the frame 12. The first rotatable member 18 is positioned within the opening 16 of frame 12 and is adapted to bear against the inner surface of frame 12 in such a manner that the first rotatable member 18 is free to rotate with respect to the frame 12. The rotatable member 18 is preferably a cylindrical disc and has an opening or bore 20 eccentrically therein which defines an inner surface for the rotatable member 18. A second rotatable member 22 is positioned within the opening 20 in the first rotatable member 18 and is adapted to bear against the inner surface of the first rotatable member 18 in such a manner that the second rotatable member 22 is free to rotate with respect to the first rotatable member 18 in an eccentric fashion. A third rotatable member 24 is affixed eccentrically to the second rotatable member 22 and is adapted to rotate therewith about a fixed axis 26. The second rotatable member 22 is preferably a cylindrical disc, and the third rotatable member 24 is preferably a shaft. The shaft 24 may be integral with the disc 22 or may be affixed to the disc 22 by any suitable means, such as, by pinning the shaft 24 to the disc 22. The shaft 24 is either connected to a valve stem or, as shown in FIGS. 1 and 2, is a valve stem. The valve stem 24 may in turn be connected, for example, to a butterfly valve 28 located within a conduit 30. The valve stem 24 serves to open and close the butterfly valve 28 in response to rotational movement of the stem 24. As will be seen later, linear movement of the frame 12 results in rotational movement of the valve stem 24 and thus serves to open and close the valve 28. Although a bushing interface between moving surfaces is illustrated in FIGS. 1 and 2, it is to be understood that if necessary, either needle, roller, or ball bearings may be inserted along the inner surfaces 16 and 20 of frame 12 and rotatable member 18, respectively.

The valve actuator 10 further includes means connected to the rotatable members 18 and 22 for forming a positive coupling between the members 18 and 22, whereby linear movement of the frame will be converted to rotational movement of the stem 24 and whereby rotational movement of the stem 24 will be converted to linear movement of the frame 12. The means for forming a positive coupling includes means for forcing one of the members 18 and 22 to rotate in a first direction in response to rotational movement by the other of the members 18 and 22 in a direction opposite to the first direction.

The means for forming a positive coupling preferably comprises a mechanical coupling which includes a first drive means affixed to the rotatable member 18 and adapted to rotate therewith. The first drive means is preferably an internal sector or ring gear 32 which is affixed to the rotatable member 18 by means of a plurality of arms 34. The mechanical movement of the present invention further includes a second drive means which is affixed to the rotatable member 22 and adapted to rotate therewith. The second drive means preferably includes an arm 36 which is affixed to the rotatable member 22 and a pair of spur gears 38 and 40 journalled on the end of the arm 36 so as to be free to rotate with respect to the arm 36, but not with respect to each other. For example, the spur gears 38 and 40 could be pinned to a common shaft, to thereby force the spur gears to rotate in unison.

The mechanical movement of the present invention further includes a third drive means which is fixed to ground, so as to be incapable of either rotational or linear movement. The third drive means is preferably a grounded gear 42. The grounded gear 42 is preferably a circular internal or ring gear which is centered about the axis of rotation 26 of stem 24. The gear 42 may be grounded in any suitable manner, for example, by affixing the gear 42 to the conduit 30. This is preferably accomplished by mounting the gear 42 on the valve actuator housing. The grounded gear 42 is adapted to engage the spur gear 38, and the internal sector gear 32 is adapted to engage the spur gear 40. As will be explained in more detail later, the center of the rotatable member 22 rotates about the fixed axis 26, and the sector gear 32, although fixed to rotatable member 18, is concentric with rotatable member 22. The frame 12, the rotatable members 18 and 22 and the shaft 24 may be manufactured from any material of suitable strength, such as, cast iron. The gears may also be manufactured from any material of suitable strength, such as, a stamped metal.

Figure 3E:
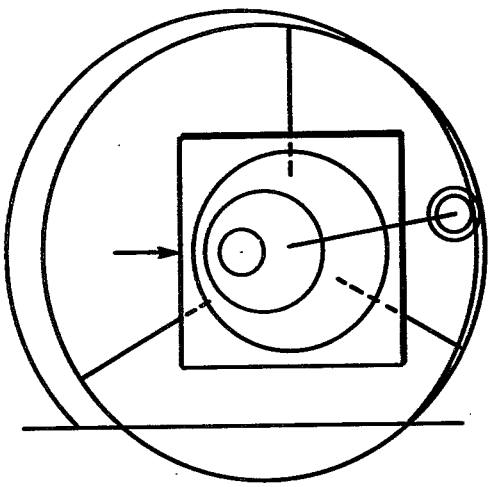
Figure 3B:
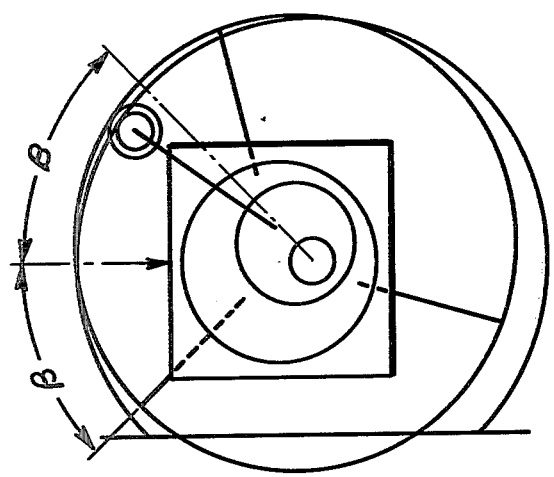
Figure 3D:
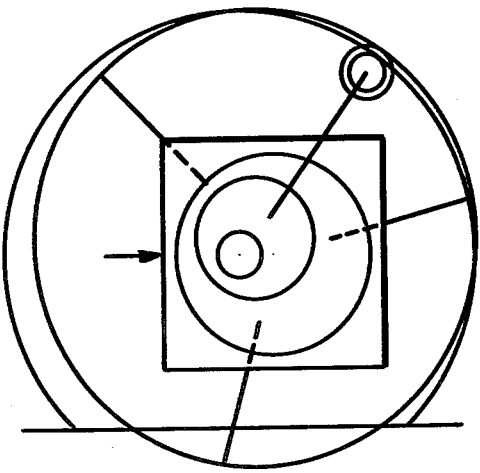
Figure 3A:
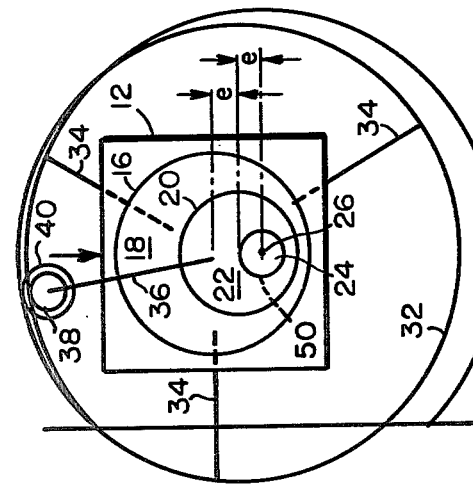

The operation of the mechanical movement of the present invention will now be described in detail in connection with FIGS. 3A through 3E. In FIGS. 3A through 3E, the outer edge 50 of the shaft 24 is coincident with the locus of the central axis of rotatable member 22 as the shaft 24 rotates through 360 degrees. In addition, it should be noted that the eccentricity between the shaft 24, the rotatable member 22, and the rotatable member 18 is such that in the "dead center" position shown in FIG. 3A the central axis 26 of shaft 24 is spaced a distance e from the central axis of the rotatable member 22. Likewise, the central axis of the rotatable member 22 is spaced a distance e from the central axis of the rotatable member 18. Thus, the central axis 26 of shaft 24 is spaced a distance 2e from the central axis of rotatable member 18. If the movement is moved off "dead center" by clockwise or rotational movement of the shaft 24 or if the movement is initially off "dead center" and if a linear force input is applied to the frame 12, the shaft 24 and the rotatable member 22 will begin to rotate in a clockwise direction through an angle $\beta$. The rotatable member 18 will rotate in the counterclockwise direction about its moveable central axis the same angle $\beta$. Thus, in FIG. 3B the rotatable members 18 and 22 have rotated through an angle of 45 degrees and the frame 12 has moved downward a distance 0.586 e. In FIG. 3C the members 18 and 22 have rotated through an angle of 90 degrees, and the frame 12 has moved downward a distance 2e. In FIG. 3D the members 18 and 22 have rotated through 135 degrees, and the frame 12 has moved downward a distance 3.414 e. In FIG. 3E the members 18 and 22 have rotated through 180 degrees, and the frame 12 has moved downward a distance 4e. If the shaft 24 were used as a rotatable input and rotated continuously, it is apparent that the frame 12 will follow a reciprocating linear path having a total stroke equal to 4e.

Figure 4:
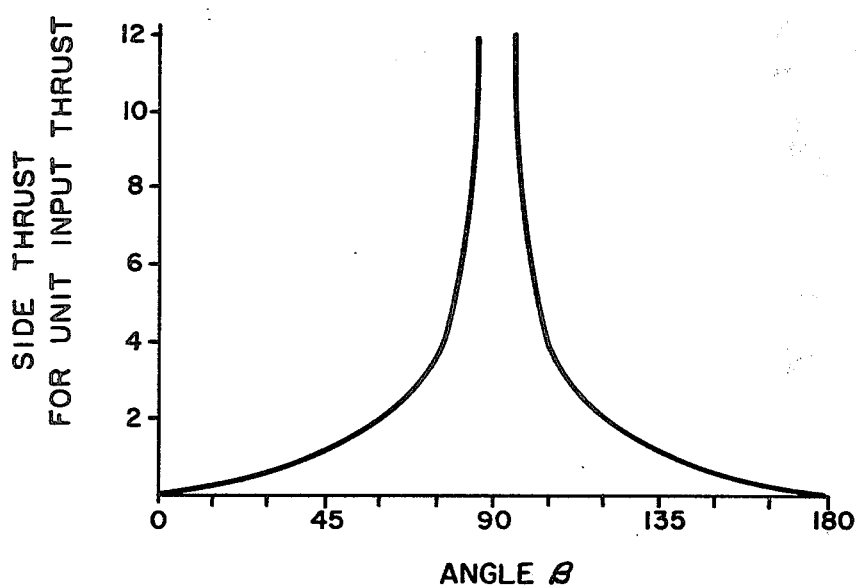
FIG. 4 shows a graph illustrating the relationship between the sideward thrust on the rotatable members and the angular position of a mechanical movement not including the positive coupling of the present invention.

In order to emphasize the importance of minimizing the sideward thrust on rotational members 18 and 22 by providing a positive coupling therebetween, FIG. 4 shows a graph of side thrust for a unit linear input thrust versus the angular position, as measured by the angle $\beta$, of a mechanical movement not including the positive coupling of the present invention. This graph is a theoretical representation in that it assumes zero friction between all moving parts. It can easily be seen from FIG. 4, that as the rotatable members 18 and 22 approach 90 degrees, the position shown in FIG. 3C, infinite sideward thrust builds up on the members 18 and 22. In practice, prior art movements of the present type, without the positive coupling of the present invention, tended to bind near the 90 degree position. Thus, it can be seen that under light load conditions prior art movements of the present type would tend to build up stress approaching the 90 degree position and then experience a rapid decrease in stress just past the 90 degree position. This would result in a snap action past the 90 degree position, putting undue stress on both the output shaft and the linear input device. Under heavy load conditions it is apparent that prior art movements would tend to bind near the 90 degree position and even cause shearing of input and output members.

Figure 5:
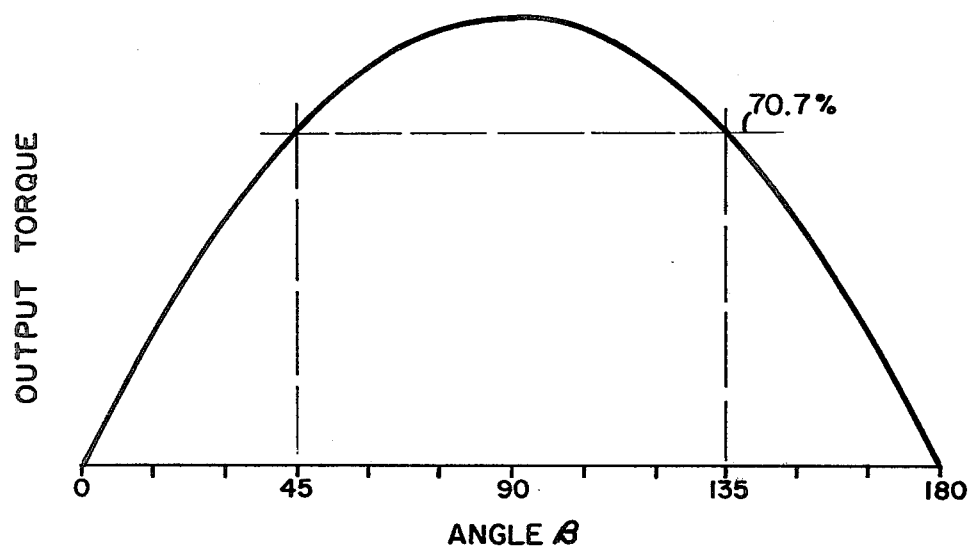
FIG. 5 shows a graph illustrating the relationship between the output torque and the angular position of the mechanical movement of the present invention.

FIG. 5 illustrates a graph of the output torque at shaft 24 of the present invention as the angle $\beta$ varies from zero to 180 degrees. Once again, this is a theoretical graph in that it assumes no friction between moving parts. It is evident that at 0 degrees and at 180 degrees, output torque is zero. This is because at 0 degrees and 180 degrees the mechanical movement is at "dead center." The movement of the present invention cannot be activated by a linear input when it is in the "dead center" position. Either a rotational input or some momentum is required to move the rotatable members 18 and 22 off "dead center." However, as the movement moves off dead center it is apparent from FIG. 5 that there is a sinusoidal variation in the output torque between 0 and 180 degrees. This output torque peaks at 90 degrees and because of the positive coupling of the present invention, the output torque between 45 and 135 degrees remains relatively smooth. Prior art movements of the present type would experience a marked decrease in output torque near the 90 degree position, as suggested by FIG. 4. However, the positive coupling shown in FIGS. 1 and 2 tends to smooth out the operation of the mechanical movement of the present invention by eliminating wide variations in torque near the 90 degree position and thereby reducing stress on the shaft 24 and the linear input 14.

The particular form of positive coupling between members 18 and 22 shown in FIGS. 1 and 2 is preferred since such a gearing arrangement reduces gear tooth load to a minimum level. However, many other types of possible couplings and gearing arrangements may be suitable and would fall within the scope of the present invention.

The mechanical movement of the present invention is particularly advantageous for use in applications that require approximately 90 degrees of rotational movement, such as the operation of the valve shown in FIGS. 1 and 2. It is evident from FIG. 5 that the torque varies substantially between 0 degrees and 45 degrees and between 135 degrees and 180 degrees. On the other hand, the torque remains fairly constant between 45 degrees and 135 degrees. Thus, one skilled in the art can select a 90 degree range of operation to suit the characteristics of the particular device being actuated.

Additionally, it is within the scope of the present invention in applications other than that shown in FIGS. 1 and 2, to utilize the gear 42 as a rotational input to the mechanical movement. In addition to the butterfly valve illustrated in FIGS. 1 and 2, the mechanical movement of the present invention is equally effective for use as an actuator in ball valves, various eccentric valves, and any device requiring approximately 90 degrees of actuation.

Accordingly, a mechanical movement has been provided which may be manufactured from only a few easily fabricated parts. The mechanical movement is quite compact and can operate in a relatively small space. Furthermore, the mechanical movement of the present invention is quite sturdy and can transmit a substantial amount of force.

While there has been described what is at present considered to be the preferred embodiment of the present invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A mechanical movement for converting between linear and rotation movement, for operating a device, including:
   (a) a frame being adapted to move only along a linear path of travel;
   (b) a first rotatable member adapted to bear against said frame in such a manner that said first rotatable member is free to rotate with respect to said frame;
   (c) a second rotatable member adapted to bear against said first rotatable member in such a manner that said second rotatable member is free to rotate with respect to said first rotatable member in an eccentric fashion; and
   (d) a third rotatable member, affixed to said second rotatable member and adapted to rotate therewith, said third rotatable member being adapted to rotate only about a fixed axis; the improvement comprising:
   (e) means including a ring gear secured to said first rotary member and a fixed ring gear for positively coupling the rotary members for minimizing sideward thrust on said first and second rotatable members, whereby linear movement of said frame will be converted to rotational movement of said third rotatable member and whereby rotational movement of said third rotatable member will be converted to linear movement of said frame.

2. A mechanical movement as set forth in claim 1, wherein said device is a valve.

3. A mechanical movement as set forth in claim 2, wherein said third rotary member is a valve stem.

4. A mechanical movement as set forth in claim 1, wherein said mechanical coupling further includes a second drive means affixed to said second rotatable member and adapted to rotate therewith.

5. A mechanical movement as set forth in claim 4, wherein said second drive means includes an arm affixed to said second rotatable member and a pair of spur gears mounted on said arm so as to be free to rotate with respect to said arm.

6. A mechanical movement as set forth in claim 5 further comprising a shaft affixed to said spur gears to force said spur gears to rotate in unison.

7. A mechanical movement as set forth in claim 5, wherein said first drive means is a gear and is adapted to engage one of said pair of spur gears.

8. A mechanical movement as set forth in claim 7, wherein said means for forming a positive coupling further includes a third drive means, said third drive means being fixed to ground, so as to be incapable of either rotational or linear movement.

9. A mechanical movement as set forth in claim 8, wherein said third drive means is a grounded gear and is adapted to engage the other of said pair of spur gears.

10. A mechanical movement as set forth in claim 9, wherein said grounded gear is centered about said fixed axis of rotation of said third rotatable member.

11. A mechanical movement as set forth in claim 9, wherein the center of said second rotatable member rotates about said fixed axis and wherein said first drive gear is concentric with said second rotatable member.

12. A mechanical movement for converting between linear and rotational movement for operating a device comprising frame means adapted to move only in a linear path, first circular member means inserted in a bore in the frame means, a second circular member means inserted eccentrically in the first circular member means, a shaft eccentrically secured to the second circular member means operable about a fixed axis to be rotated in response to linear movement of the frame, positively driven gear means responsive to the circular members wherein improved driven gear means comprises:
   (a) positively driven gear means having a first fixed ring gear and a second ring gear secured to said first circular member, and
   (b) the positively driven gear means further having spur gears, secured to said second circular member and prevented from rotating relative to each other, engaging the respective ring gears.

* * * * *